May 8, 1951 F. M. PENCE 2,551,759
KITCHEN RANGE
Filed Aug. 18, 1947 2 Sheets-Sheet 2
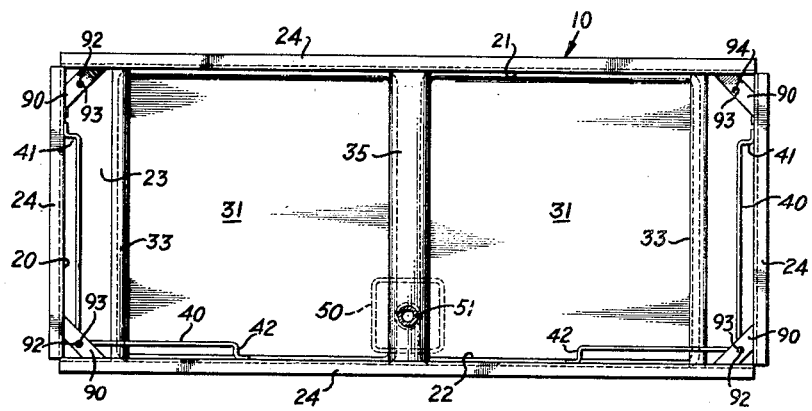
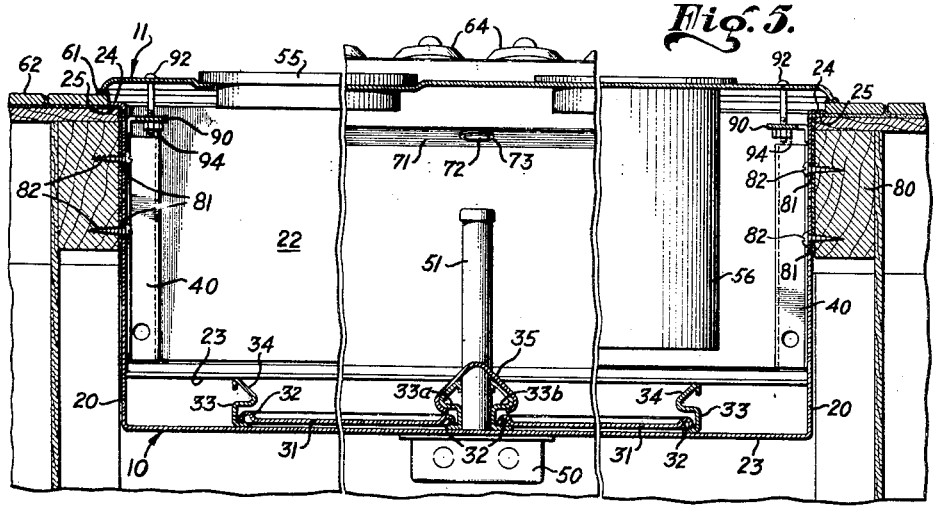
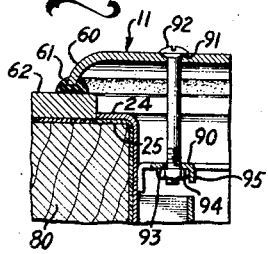
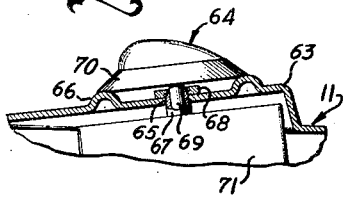
Frederick M. Pence
INVENTOR.
BY Huebner Mabley
and Bechler
ATTORNEYS.

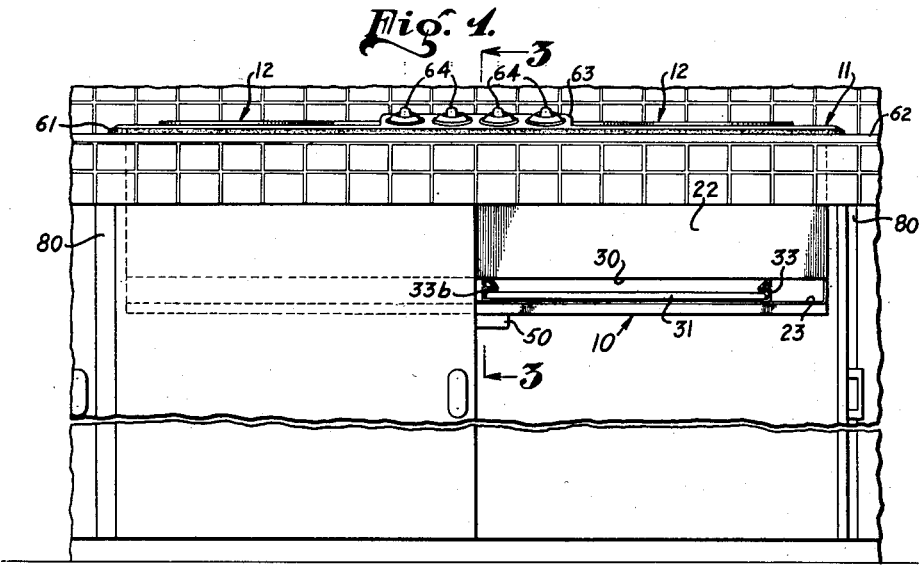
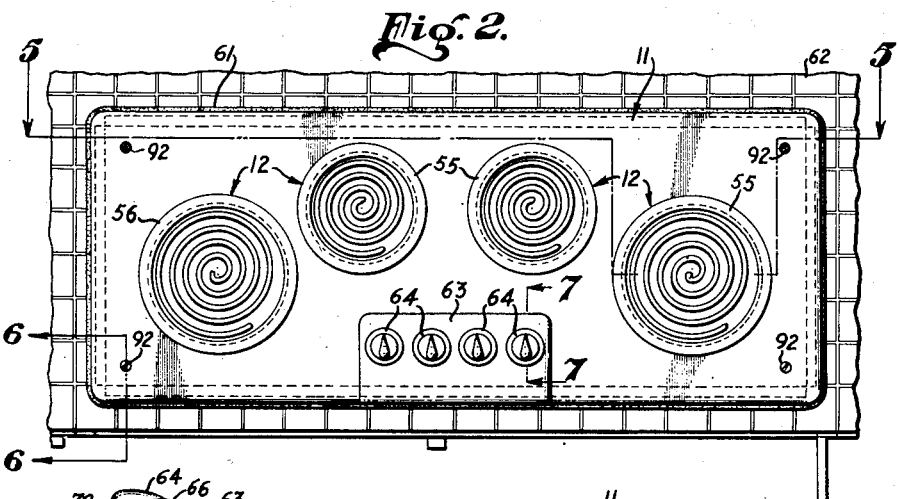
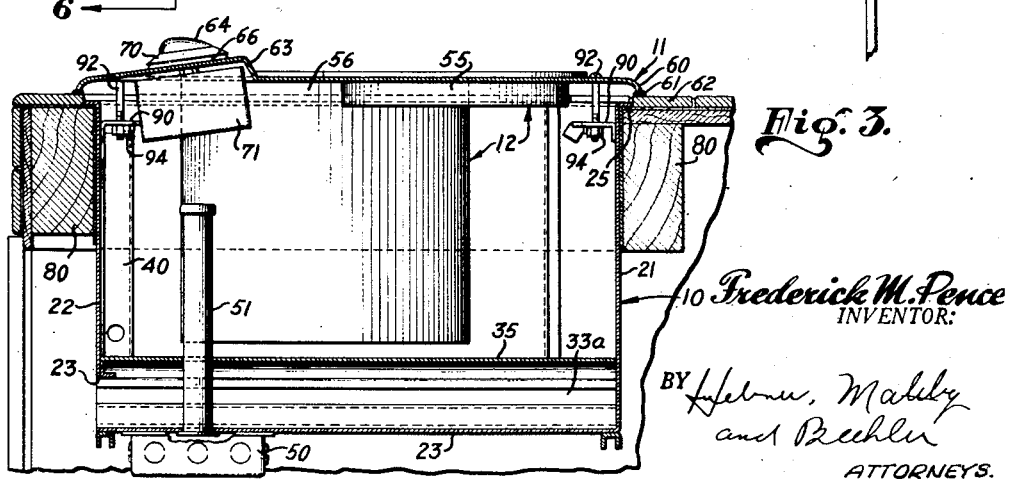

Patented May 8, 1951

2,551,759

UNITED STATES PATENT OFFICE 2,551,759

KITCHEN RANGE

Frederick M. Pence, Los Angeles, Calif., assignor to Thermador Electrical Manufacturing Company, Los Angeles, Calif., a corporation of California Application August 18, 1947, Serial No. 769,106

12 Claims. (Cl. 219—37)

1

My invention relates to kitchen ranges and has particular reference to the details of construction which permit the installation of a kitchen range as an integral part of the kitchen cabinet work or kitchen drainboard.

An object of my invention is to produce a kitchen range unit which can be built in as a part of a drainboard thereby harmonizing with any desired kitchen design and permitting a greater flexibility of location and a greater flexibility of cabinet and storage arrangements.

I am aware that others have attempted to design kitchen ranges as a unit in kitchen cabinet construction. However, such attempts have heretofore taken the form of a standard kitchen range which is recessed into the adjacent cabinet units.

To the best of my knowledge no attempts have been made to produce a unitary structure containing only the essential elements of the range and which is adapted to be fitted into any desired position in connection with the kitchen structure.

My invention has a more particular reference and will be described in connection with an electrical range. It is to be understood, however, that the general principles of my invention in their broadest aspect can be applied equally well to gas ranges as will become apparent from the specifications to follow. Electrical ranges, as heretofore known to the industry, have been produced as an independent unit, including a large and expensive cabinet.

A further object of my invention is to produce an electrical range having a minimum of cabinet construction and which can be produced at a cost far less than standard electrical ranges and yet which will be fully satisfactory from an operating and use standpoint.

A further object of my invention is to produce a built-in electrical kitchen range which can readily be installed in any desired position in the kitchen by practically any unskilled laborer.

Other and further objects and advantages of my invention will become apparent from the drawings and specifications relative thereto.

In the drawings:

Figure 1 is a front elevational view of an electrical range embodying the principles of my invention installed in a tile drainboard.

Figure 2 is a top plan view of the range shown in Figure 1.

Figure 3 is a sectional view taken on line 3—3 of Figure 1.

Figure 4 is a top plan view showing the cover of the range removed.

Figure 5 is a sectional view taken on line 5—5 of Figure 2.

Figure 6 is a sectional view taken on line 6—6 of Figure 2.

2

Figure 7 is a sectional view taken on line 7—7 of Figure 2.

Referring to Figures 1, 2 and 3, the essential features of my invention comprise a housing, designated generally 10, a grid supporting cover, designated generally 11, mounted on top of the housing 10, and a plurality of electrical grids 12 disposed in said grid supporting cover 11.

Referring more specifically to Figure 4, the housing 10 comprises a rectangular shaped box having an open top, end walls 20, a back wall 21, a front wall 22 and bottom 23. The end walls 20, back wall 21 and front wall 22 are formed with mounting flanges 24. The purpose of the mounting flange 24 is to position the box 10 with respect to the surface of the recess into which the box is mounted as is shown in Figure 5, wherein the flange 24 rests on a shoulder 25. As will be seen from a further description of my invention, the exact positioning of the box 10 is not critical and considerable variation is permissible.

The front wall 22 is formed with a longitudinal slot 30 extending across the face of the box 10, the purpose of which, as will become apparent, is for increased ventilation to prevent an accumulation of heat inside the box and to permit the installation of drip pans 31. The drip pans 31 are essentially flat square sheets of metal or other suitable material having a bead 32 extending around the edge of the drip pan 31. The bead 32 prevents warping of the drip pan 31 and also acts as a retainer wall in the event of an excessive spillage of fluid from around the grids 12. The drip pans 31 slide in tracks 33 which extend from the front to the rear of the box 10. The tracks 33 are formed with a substantially U-shaped channel on the bottom to receive the drip pan 31 and an upper angular section 34. The upper angular section 34 acts as an auxiliary drip tray so that any fluids dripping from the grids above and striking the sloping section 34 run into the drip pan 31 rather than around the edge or underneath it. The U-shaped channel of the track 33 is secured to the bottom 23 of the box 10 by any suitable means, such as spot welding, and incidentally, also serve to strengthen the bottom 23 to prevent warpage.

The central drip pan tracks 33a and 33b are covered with a substantially triangular-shaped cap 35 extending from the front to the rear of the box and formed to hook under the sloping portion of said tracks. The purpose of the cap 35 is to eliminate any possible opening between the tracks 33a and 33b to make sure that all drippings will be deposited in the drip pans 31.

An L-shaped member 40 having offset mounting lugs 41 and 42 is attached vertically adjacent the ends 20 of the box 10 but spaced therefrom. The L-shaped member 40 terminates short of the bottom 23 and the top 11, thereby defining a channel for the circulation of air from the top to the bottom, thereby eliminating the necessity of insulating the end panels 20 in order to prevent excessive heat being transmitted to the cabinet structure in which the range is situated. Any heat radiated from the grills 12 will be absorbed by currents of air entering the transverse slot 30 and traveling through the space defined by the end walls 20 and the L-shaped member 40 and then escaping around the grills 12.

An electrical outlet box 50 is mounted to the underside of the bottom 23 in which electrical connections are made and which communicates with the circuit to be explained later for energizing the grils 12 by means of a riser pipe or conduit 51.

The grid supporting cover 11 comprises essentially a rectangular shaped sheet of metal or other similar or satisfactory material and is formed with downwardly extending edges 60 which said edges rest in a suitable gasket 61 and on top of the tile 62. It is to be understood that the installation is not limited to tile work but can be installed equally well on a linoleum or Masonite or other synthetic fabricated drainboard tops. The grid supporting cover 11 is also formed with an upwardly embossed section 63 which slopes downwardly towards the front of the range installation and which is adapted to receive control switches 64.

As will be noted in Figure 2, I have illustrated a range installation using four electrical grids and, therefore, illustrate four electrical switches for controlling the electrical grids. The electrical grids 12 may be surface units, such as 55 or deep well cooker 56. The type of grid or cooker and their disposition will be a matter of individual choice and such variations as individual choice may dictate should be considered as equivalents within the scope of my invention.

For further details of the switch installation, reference is made to Figure 7 wherein a switch, designated generally 64, is mounted in the raised section 63. The raised section 63 is formed with a plurality of holes 65 and concentric upwardly embossed rings 66.

The switch 64 may be of any standard construction having a tubular mounting stem 67 adapted to be held in position by a lock nut 68 and a switch control shaft 69 extending through said tubular mounting stem 67. A substantially circular control handle 70 is operatively connected to a shaft 69 and is adapted to extend outwardly over the embossed ring 66 so that any accidental spillage or drippage during cooking operations on to the handle 64 will be diverted outwardly away from the switch shaft 69, thereby protecting the switch from contaminating influences.

In Figure 5, the switches are shown enclosed by a metal box 71 having a hole 72 formed therethrough and provided with a bushing 73 adapted to permit the entrance and exit of the wiring circuits.

The specific details of the wiring circuit are not shown herein as they are standard and comprise merely a circuit running from the box 50 to the switches 64 from the switches 64 in a parallel circuit to the various grids 12.

In installing the range illustrated herein a frame 80 is constructed having an opening approximately equivalent to the outside dimensions of the box 10 and having a shoulder 25 running around the edges thereof adapted to receive the flanges 24. The end sections 20 are formed with a plurality of holes 81 adapted to receive wood screws 82. The wood screws 82 hold the box in position in the constructed opening.

It will be understood that the cover 11 and the box 10 are assembled at the point of manufacture and need not be disassembled upon installation. The method of assembly is illustrated in Figure 6. A corner bracket 90 is secured in each corner of the box 10 adjacent the upper edge. The cover 11 is formed with a plurality of countersunk holes 91 in each corner thereof situated to register with or correspond to the location of the brackets 90. A bolt 92 is inserted downwardly through the countersunk hole 91 and inserted through a hole 93 in the bracket 90. A nut 94 is secured to the lower end of the bolt 92. The nut 94 may also be secured to the bracket 90 by the use of projection welding studs or brazing or any other suitable manner so that they will not turn when attempting to tighten the bolt 92 or in some instances if the bolt is situated sufficiently close to a downwardly extending lip 95 and the corner bracket 90 and the nut 94 will be prevented from rotation by reason of such location.

When the range is installed in the opening defined by the frame 80, the end grids may readily be removed so that access can be gained to the screws 82 for securing the box in the opening. After the screws 82 have been tightened, thereby securing the housing 10 to the frame 80, the bolts 92 are tightened thereby effecting a water-tight seal around the periphery of the cover 11 and the grids 12 may then be replaced.

Thus, it will be seen that I have provided a relatively inexpensive electrical range which can be located as desired, and which is afforded a maximum of protection against radial heat without the use of expensive insulation and which results in an installation which is satisfactory from any standpoint of use without an expensive and cumbersome cabinet and yet which can be readily installed without the necessity of highly skilled labor.

Having described my invention, what I claim as new and desire to secure by Letters Patent is:

1. A stove adapted for installation in a horizontally rectangular supporting frame in a kitchen drainboard or counter having a space defined by said frame comprising a rough-in box having an open top, means for supporting said box on said frame, a cover plate adapted to close off said open top and to extend horizontally outside the periphery of the open top and overlie adjacent portions of the drainboard or counter, said cover plate having a plurality of apertures spaced inwardly from the borders and a second plurality of apertures relatively close to the forward border, heating elements superimposed over the inwardly spaced apertures, and heating element controls superimposed over the apertures which are close to the forward border.

2. A stove adapted for installation in a supporting frame in a kitchen drainboard having a space defined by said frame comprising a box-like structure having an open top and a horizontal mounting flange extending outwardly from said box-like structure adapted to mount said box-like structure in the space on said frame substantially flush with the top of said drainboard, a cover plate adapted to enclose said opening of said box-like structure and to extend beyond the periphery thereof to form a contact with said drainboard, said cover plate being formed with a plurality of apertures, electrical heat generating means mounted on said cover in said apertures, and a raised portion, said raised portion being formed with a plurality of apertures and a plurality of upwardly embossed rings concentric with said second mentioned apertures, and means for controlling said electrical heat generating means, said last means comprising switches mounted on said raised portion and having parts extending through said apertures, each switch having a substantially circular control handle which said handle overlies said embossed rings to prevent foreign matter from reaching said apertures.

3. An electric range adapted for installation in a supporting frame in a drainboard or flat topped cabinet having a space defined by said frame, said range comprising a box-like structure having an open top, a plurality of mounting flanges disposed about the upper edge of said box-like structure and adapted to extend beyond the edges of said aperture and to mount said box-like structure on said frame substantially flush with said drainboard or cabinet top, a cover adapted to overlie said box-like structure and extend beyond the outer limits of said mounting flanges, said cover being formed with downwardly turned edges adapted to engage the surface of said drainboard or cabinet top, a plurality of apertures in said cover, electrical resistance units mounted in said apertures, and a raised portion on said cover formed with a plurality of apertures, means for controlling said electrical resistance units said means having parts depending through said apertures, and an upwardly embossed ring concentric with each of said apertures, each of said control means comprising an electrical switch having a substantially circular control handle adapted to overlie said embossed ring to prevent foreign matter from reaching said apertures.

4. A cabinet unit for an electric range adapted for installation in a rectangular supporting frame having plane marginal surfaces outwardly extending therefrom, said cabinet unit comprising: a rectangular-shaped metal box formed with side and end walls and bottom and open at the top and provided with outwardly projecting marginal flanges adapted to rest upon such a frame and support said unit thereon, a cover plate overlying the open top and connected to said box, said cover plate extending in all directions outwardly beyond the edges of said flanges, sealing means associated with and extending completely around the edge of said cover plate and adapted to effect a seal between said cover plate and the aforesaid plane surface, and apertures in said cover plate for the reception of electric burner elements.

5. A cabinet unit for an electric range adapted for installation in a rectangular supporting frame having plane marginal surfaces outwardly extending therefrom, said cabinet unit comprising: a rectangular-shaped metal box open at the top and provided with outwardly projecting marginal flanges adapted to rest upon such a frame, a cover plate overlying the open top and connected to said box, said cover plate extending in all directions outwardly beyond the edges of said flanges, a sealing gasket associated with and extending completely around the edge of said cover plate and adapted to effect a seal between said cover plate and the aforesaid plane surface, flanged apertures in said cover plate for the reception of electric burner elements, a raised embossed control panel formed on said cover plate rising abruptly from said plate at the rear of said panel and sloping toward the front thereof, raised annular rings formed on said control panel, electric switch control knobs associated with said annular rings, said knobs having flanges overlying the crest of said rings to shed liquids or foreign matter therefrom, and an electric switch box immediately beneath and supported by said control panel.

6. A cabinet unit for a range adapted for installation in a rectangular supporting frame having plane marginal surfaces outwardly extending therefrom, said cabinet unit comprising: a rectangular shaped metal box open at the top and formed with hanger means adapted to rest upon such a frame, a cover plate overlying the open top and connected to said box, said cover plate extending in all directions outwardly beyond the edges of said box, flanged apertures in said cover plate for the reception of burner elements, heat insulating walls at the sides and front walls of the box extending around the corners, and attached at vertical edges thereof to said side and front wall, said insulating walls being mounted upon and spaced from the interior surfaces of said box and extending vertically from a level near the top of said box to a level above the bottom thereof, whereby air may circulate up through the passageways formed between the interior surface of the box and the said insulating walls, said walls extending across both ends and the front of said box.

7. A cabinet unit for an electric range adapted for installation in a rectangular supporting frame having plane marginal surfaces outwardly extending therefrom, said cabinet unit comprising: a rectangular-shaped metal box open at the top and formed with outwardly projecting marginal flanges adapted to rest upon such a frame, a cover plate overlying the open top and connected to said box, said cover plate extending in all directions outwardly beyond the edges of said flanges, a sealing gasket associated with and extending completely around the edge of said cover plate and adapted to effect a seal between said cover plate and the aforesaid plane surface, flanged apertures in said cover plate for the reception of and support of electric burner elements, a raised embossed control panel formed on said cover plate sloping toward the front thereof, raised annular rings formed on said control panel, electric switch control knobs associated with said annular rings, said knobs having flanges overlying said rings to shed liquids or foreign matter therefrom, an electric switch box immediately beneath and supported by said control panel, means for housing electric conduits extending from the exterior of said first box to a point adjacent to the switch box, and heat insulating walls mounted upon and spaced from the interior surface of said first box extending vertically from a point near the top of said first box to a point near the bottom thereof, whereby air may circulate up through the passageways formed between the surface of said first box and the said insulating walls, said walls extending across both ends and the front of said first box.

8. A cabinet unit for an electric range adapted for installation in a rectangular supporting frame having plane marginal surfaces outwardly extending therefrom, said cabinet unit comprising: a rectangular-shaped metal box formed with side and end walls and bottom and open at the top and formed with outwardly projecting marginal flanges adapted to rest upon such a frame and support said unit thereon, a cover plate overlying the open top and connected to said box, said cover plate extending in all directions outwardly beyond the edges of said flanges, a sealing gasket associated with an extending completely around the edge of said cover plate and adapted to effect a seal between said cover plate and the aforesaid plane surface, flanged apertures in said cover plate for the reception of and support of electric burner elements, a raised embossed control panel formed on said cover plate rising abruptly from said plate at the rear of said panel and sloping toward the front thereof, raised annular rings formed on said control panel, electric switch control knobs associated with said annular rings, said knobs having flanges overlying the crest of said rings to shed liquids or foreign matter therefrom, an electric switch box immediately beneath and supported by said control panel, means for housing electric conduits extending from the exterior of said first box to a point adjacent to the switch box, and heat insulating walls mounted upon and spaced from the interior surface of said first box extending vertically from a point near the top thereof to a point near the bottom thereof, whereby air may circulate up through the passageways formed between the surface of said first box and the said insulating walls, said walls extending across both ends and the front of said first box.

9. A cabinet unit for an electric range adapted for installation in a rectangular supporting frame having plane marginal surfaces outwardly extending therefrom, said cabinet unit comprising: a rectangular-shaped metal box formed with side and end walls and bottom and open at the top and provided with outwardly projecting marginal flanges adapted to rest upon such a frame and support said unit thereon, a cover plate overlying the open top and connected to said box, said cover plate extending in all directions outwardly beyond the edges of said flanges, sealing means associated with and extending completely around the edge of said cover plate and adapted to effect a seal between said cover plate and the aforesaid plane surface, apertures in said cover plate for the reception of electric burner elements, a bracket on the interior of the box, a nut retained on said bracket, and a tightening screw extending from externally of the cover plate through the same to the nut on the bracket whereby the cover plate may be tightened down to compress the sealing means against said plane surface.

10. A cabinet unit for an electric range adapted for installation in a rectangular supporting frame having plane marginal surfaces outwardly extending therefrom, said cabinet unit comprising: a rectangular-shaped metal box formed with side and end walls and bottom and open at the top and provided with outwardly projecting marginal flanges adapted to rest upon such a frame and support said unit thereon, a cover plate overlying the open top and connected to said box, said cover plate extending in all directions outwardly beyond the edges of said flanges, sealing means associated with and extending completely around the edge of said cover plate and adapted to effect a seal between said cover plate and the aforesaid plane surface, apertures in said cover plate for the reception of electric burner elements, drip pans extending from front to back in the box below the burner apertures, and a drip pan divider which extends from front to back of the box in the center thereof so that any liquid or foreign matter falling through the burner apertures in the center of the box will be diverted right or left into the drip pan areas.

11. An electric range adapted for installation in a rectangular supporting frame having plane marginal surfaces outwardly extending therefrom, said range comprising: a rectangular-shaped metal box open at the top and formed with outwardly projecting marginal flanges adapted to rest upon such a frame, a cover plate overlying the open top and connected to said box, said cover plate extending in all directions outwardly beyond the edges of said flanges, a sealing gasket associated with an extending completely around the edge of said cover plate and adapted to effect a seal between said cover plate and the aforesaid plane surface, flanged apertures in said cover plate, electric burner elements supported on the flanges of said apertures, a raised embossed control panel formed on said cover plate sloping toward the front thereof, raised annular rings formed on said control panel, electric switch control knobs associated with said annular rings, said knobs having flanges overlying the crest of said rings to shed liquids or foreign matter therefrom, an electric switch box immediately beneath and supported by said control panel, means for housing electric conduits extending from the exterior of said first box to a point adjacent to the switch box, heat insulating walls mounted upon and spaced from the interior surface of said first box extending vertically from a point near the top thereof to a point near the bottom thereof, whereby air may circulate up through the passageways formed between the surface of said first box and the said walls, said walls extending across both ends and the front of said box, said switches and said burner elements being adapted to conventional electrical interconnection.

12. A self-contained stove unit adapted for installation in a horizontally rectangular supporting frame in a counter having a substantially rectangular space defined by said frame comprising a substantially rectangular rough-in box having a bottom, side and front walls and an open top, anchor means adjacent the tops of the walls adapted to engage said frame whereby the box is suspended in the frame and anchored against removal therefrom, a cover plate larger in size than the open top having a position covering said open top and extending outwardly therefrom to a position overlying the counter on all sides of the box, hold-down means engaging the cover plate and the box whereby the cover is secured to the box and pressed into engagement with the counter, said cover plate having a plurality of apertures, and heating elements and controls therefor secured to the cover plate in their respective apertures.

FREDERICK M. PENCE.

REFERENCES CITED

The following references are of record in the file of this patent:

UNITED STATES PATENTS

| Number | Name | Date |
| --- | --- | --- |
| 1,492,582 | Smith | May 6, 1924 |
| 2,019,945 | Chafee | Oct. 29, 1935 |
| 2,178,411 | Tietz | Oct. 31, 1939 |
| 2,295,378 | Barnsteiner | Sept. 8, 1942 |
| 2,328,129 | Earle | Aug. 31, 1943 |
| 2,375,242 | Lockwood et al. | May 8, 1945 |